United States Patent [19]

Christophliemk et al.

[11] Patent Number: 4,591,491
[45] Date of Patent: * May 27, 1986

[54] PROCESS FOR THE CONTINUOUS CONVERSION OF META-KAOLIN INTO VERY FINELY-DIVIDED ZEOLITIC SODIUM ALUMINO-SILICATE

[75] Inventors: Peter Christophliemk, Dusseldorf; Willi Wüst, Ratingen-Hösel, both of Fed. Rep. of Germany

[73] Assignee: Henkel Kommanditgesellschaft auf Aktien, Dusseldorf, Fed. Rep. of Germany

[*] Notice: The portion of the term of this patent subsequent to Feb. 1, 2000 has been disclaimed.

[21] Appl. No.: 628,969

[22] Filed: Jul. 11, 1984

Related U.S. Application Data

[63] Continuation-in-part of Ser. No. 395,643, Jul. 6, 1982, abandoned.

[30] Foreign Application Priority Data

Feb. 4, 1982 [DE] Fed. Rep. of Germany ....... 3203777

[51] Int. Cl.$^4$ ............................................. C01B 33/28
[52] U.S. Cl. .................... 423/329; 423/118; 423/328; 423/332; 502/60
[58] Field of Search ............... 423/328, 329, 118, 332; 502/60

[56] References Cited

U.S. PATENT DOCUMENTS

| 4,089,929 | 5/1978 | Christophliemk et al. | 423/329 |
| 4,267,158 | 5/1981 | Christophliemk et al. | 423/328 |
| 4,278,649 | 7/1981 | Christophliemk et al. | 423/328 |
| 4,371,510 | 2/1983 | Christophliemk et al. | 423/328 |

FOREIGN PATENT DOCUMENTS

| 001248 | 6/1980 | European Pat. Off. |
| 0016393 | 10/1980 | European Pat. Off. |
| 0027228 | 4/1981 | European Pat. Off. |
| 132069 | 8/1978 | German Democratic Rep. |

OTHER PUBLICATIONS

91:44977g Crystalline, Partly Crystalline, or Amorphous Aluminosilicates, (Robert Bankwitz).

Primary Examiner—John Doll
Assistant Examiner—Jackson Leeds
Attorney, Agent, or Firm—Ernest G. Szoke; Henry E. Millson, Jr.; Mark A. Greenfield

[57] ABSTRACT

In a process for the conversion of meta-kaolin into an aqueous alkaline suspension of low-grit, water-containing zeolitic sodium aluminosilicate of the smallest particle size having the molar composition:

0.9 to 1.1 $Na_2O$: 1 $Al_2O_3$: 1.8 to 2.3 $SiO_2$ with a water content depending on the degree of drying, which contains at least 99.8% by weight of a particle size of less than 25$\mu$ and has a high cation exchange capability, the improvement consisting of:
 slowly heating a suspension of reactants to a zeolitization temperature in the range of from 70° to 100° C., with a temperature rise averaging 20° C. within a period of from two to ten minutes,
 feeding the suspension, preferably before said slow heating, continuously into a reactor having progressively, separately zoned mixing areas with a stage-like effect and having at least seven stages while mixing said suspension sufficiently in the respective stages to avoid sedimentation,
 maintaining said suspension in the reactor at a preselected temperature in the range of from 70° to 100° C. until the degree of crystallization of the zeolitic sodium aluminosilicate, determined by X-ray, has reached at least 80% of the theoretically possibility crystallinity, and
 continuously removing an aqueous, alkaline suspension of zeolitic sodium aluminosilicate from the end opposite of the intake end of the reactor.

The suspension traverses the reactor at a rate in the range of 1 to 3 cubic meters of suspension per cubic meter of reactor volume and per hour. Reactors preferred for the reaction are an agitator vessel cascade with at least seven vessels, an agitator column with at least seven chambers, and a flowing tube reactor which has a ratio of tube length to tube diameter in the range of 3,000 to 7,000.

24 Claims, 2 Drawing Figures

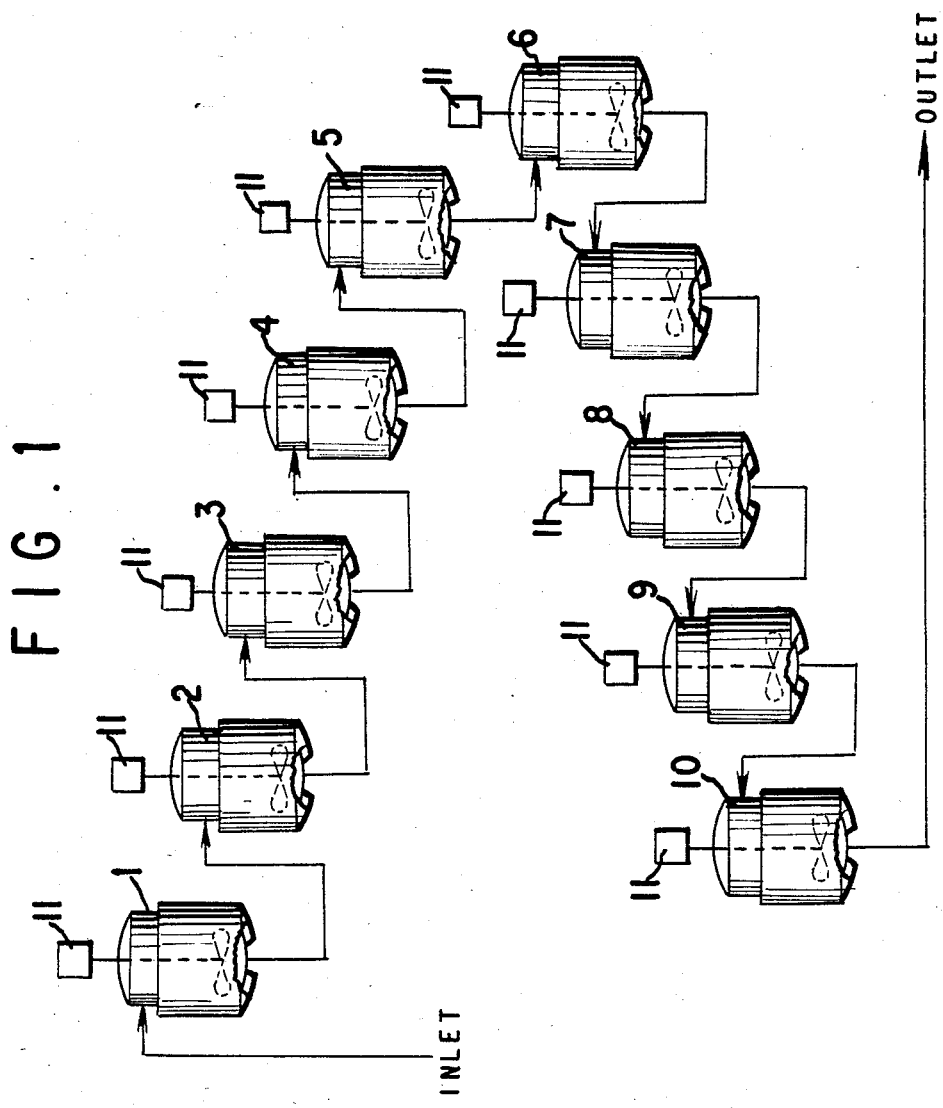

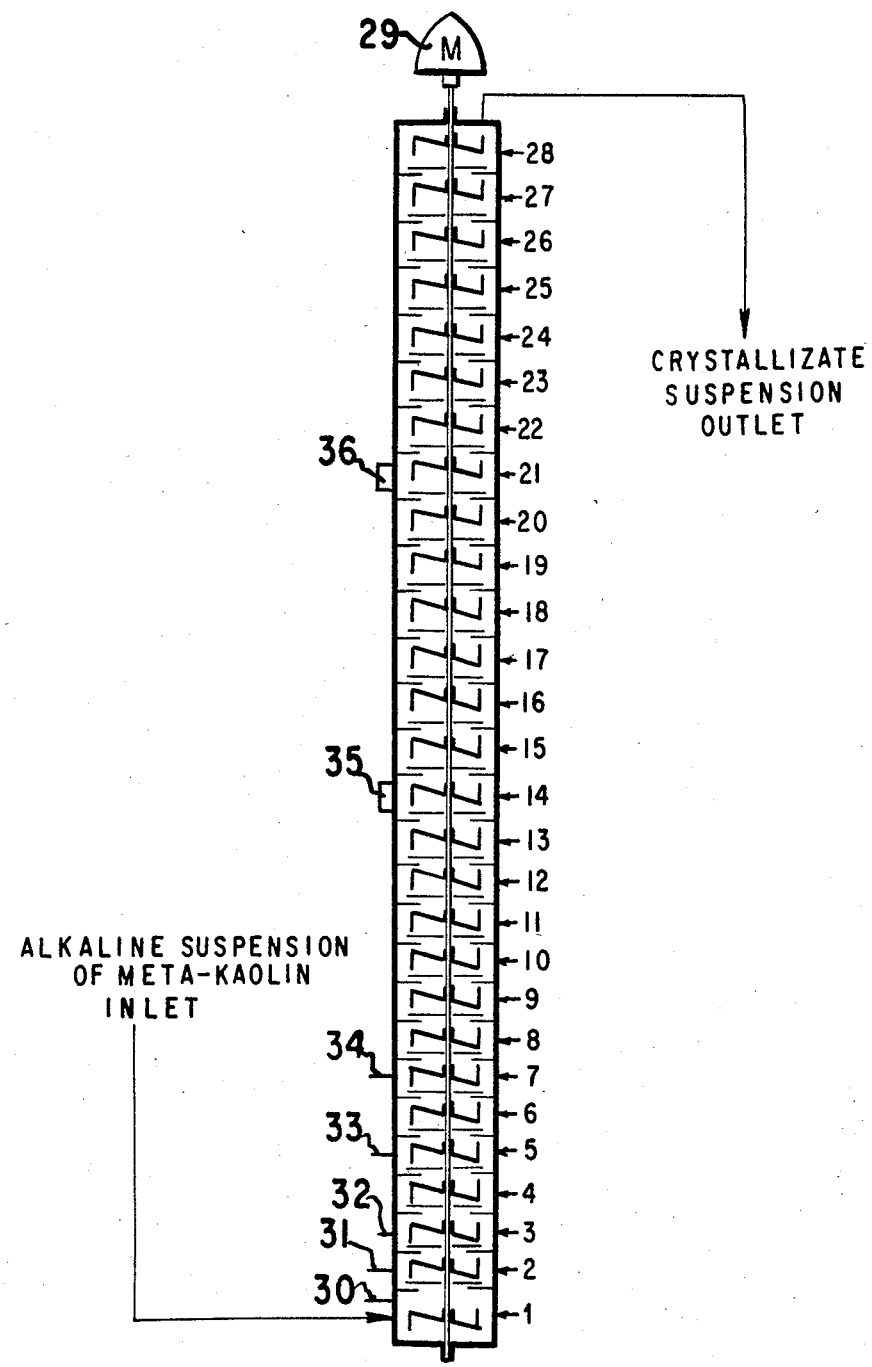

PROCESS FOR THE CONTINUOUS CONVERSION OF META-KAOLIN INTO VERY FINELY-DIVIDED ZEOLITIC SODIUM ALUMINO-SILICATE

This application is a continuation-in-part, of application Ser. No. 395,643, filed July 6, 1982.

BACKGROUND OF THE INVENTION

The invention relates to a process for the continuous conversion of meta-kaolin into very finely-divided, low-grit, aqueous zeolitic sodium aluminosilicate of the composition:

0.9 to 1.1 $Na_2O$:1 $Al_2O_3$:1.8 to 2.3 $SiO_2$ of which at least 99.8% by weight have a particle size less than 25μ and a high cation exchange capacity and which occurs in the form of an aqueous alkaline suspension,
(a) by reacting meta-kaolin with sodium hydroxide at elevated temperatures,
(b) in an aqueous alkaline suspension which has a composition corresponding to molar ratios of:

1.5 to 5 NaO:1 $Al_2O_3$:1.8 to 2.3 $SiO_2$:40 to 200 $H_2O$ which is obtained by mixing meta-kaolin with aqueous soda lye.

The so-called zeolites form a mineral class of alkali metal aluminosilicates with water of crystallization whose aluminosilicate lattice has a defined pore and spatial structure. Synthetic zeolites have gained increasing technical importance and are used, for example, as catalyst supports in chemical processes, as drying, separating or adsorption agents for solvents and gases ("molecular sieves") and as heterogeneous inorganic builders in detergents and cleaning agents. Depending on the purpose of use, structurally different zeolite types as well as different degrees of dryness and purity thereof are required. Normally, such zeolites are produced first in their sodium form and, if desired, are then transformed into other forms by cation exchange.

With regard to the above-mentioned applications, in particular zeolitic sodium aluminosilicate of the NaA type has gained especial technical importance. The chemical composition of this zeolite type corresponds approximately to the empirical formula:

0.9 to 1.1 $Na_2O$:1 $Al_2O_3$:1.8 to 2.3 $SiO_2$:0 to 6 $H_2O$

The characteristic X-ray diffraction diagram of zeolite NaA has been described, for example, in U.S. Pat. No. 2,882,243.

For most technical applications, a very finely-divided zeolite with a grain size distribution as narrow as possible with grain sizes below 10μ is preferred. In particular, for use of zeolite NaA in detergents and cleansing agents, there is the additional requirement that the portion of particles having a particle size above 25μ should not be more than 0.2% by weight, and that its cation exchange capacity should be as high as possible. The particle fraction larger than 25μ, referred to in the following as "grit," can be determined by wet screening according to Mocker (DIN 53 580). For the use of zeolite NaA in detergents, a grit content of less than 0.1% by weight is often desirable. In this case, the determination of the grit content by a modified method, pressureless wet screening on a 50μ screen, may be expedient.

In the production of zeolitic alkali metal aluminosilicates, two synthesis methods different in principle may be followed. These are:
(1) The crystallization of alkali metal aluminosilicate gels, which are formed by reaction of an aqueous alkali metal aluminate solution with an aqueous alkali metal silicate solution in the presence of excess alkali. In this manner cation-exchanging products can be obtained which contain less than 100 ppm of disturbing impurities. These processes, however, are relatively expensive, as the technical products used as aluminate and silicate components must first be prepared from other raw materials.
(2) The conversion of possibly activated mineral aluminosilicate components in highly alkaline solutions.

This conversion of solid, preferably mineral aluminosilicates into zeolitic alkali metal aluminosilicates by treatment with alkali will be referred to in the following as zeolitization.

By using mineral aluminosilicates, widely-distributed in the earth's crust, the production of zeolitic alkali metal aluminosilicates can be made considerably cheaper and can be simplified. Suitable for this purpose are in particular minerals of the kaolinite group, such as Kaolinite, Nacrite, Dickite and Halloysite, in the following called "Kaolin." Kaolin is a product of disintegration by weathering of feldspar and is widely distributed in the earth's crust. The composition may vary widely from deposit to deposit. Depending on the completeness of the feldspar weathering and on the geologic history, kaolin contains, besides the main mineral kaolinite, as secondary mineral components, quartz sand, mica, other clay minerals, and in particular non-weathered feldspar. Organic admixtures therewith consist predominantly of bitumins and humins. All these impurities, which are disturbing in many technical uses of kaolin, can be removed to a large extent by elutriation. Such elutriated kaolins, so-called fine kaolins, are available on the market with a kaolinite content of over 90%.

Kaolinite has a theoretical empirical formula:

$Al_2O_3 \cdot 2 SiO_2 \cdot 2 H_2O$

However, the chemical composition of commercial kaolin may differ greatly therefrom, in particular because of the above-mentioned mineral impurities. This is noticeable in particular in the molar ratio $SiO_2$:$Al_2O_3$. Suitable for zeolitization in particular are kaolins with molar ratios $SiO_2$:$Al_2O_3$ in the range of from 1.8 to 2.3.

The laminated structure of kaolinite, on the one hand, and the basic structure of the zeolites, on the other, are very different from each other. Kaolinite can be zeolitized only after its laminated structure has been destroyed. This transformation of the highly crystalline kaolinite into the X-ray amorphous, so-called meta-kaolinite, also called destructurization, can best be effected by calcining at 550° to 800° C. Too high a calcining temperature leads to "killing" of the kaolin. Mullite phases then develop, which are no longer zeolitizable. In principle, however, the destructurization of the kaolin to meta-kaolin can be effected also mechanically by thorough grinding, or by a wet chemical process, for example, by treating with strong bases. Destructurization by calcining offers the additional advantage, besides a high space/time yield, that during it the abovementioned organic impurities are burned up.

In this manner, kaolin can be destructurized to meta-kaolin technically both intermittently and continuously. Heretofore, however, the transformation of this metakaolin into very finely-divided zeolitic alkali metal aluminosilicates could be effected on an industrial scale only discontinuously by batch processes. The procedure in such a discontinuous zeolitization process has been described, for example, in Donald W. Breck, "Zeolite Molecular Sieves," John Wiley & Sons, New York, 1974, pp. 725-742, particularly pp. 731-738. Additional methods for the production of Zeolite A from kaolin are described, for example, in German published Patent Applications DE-OS 27 15 934, DE-OS 27 22 564, DE-OS 27 25 496, DE-OS 27 43 597, DE-OS 28 23 927, and DE-OS 28 52 674, but these, too, are discontinuous processes.

OBJECTS OF THE INVENTION

An object of the present invention is to develop a process for the conversion of meta-kaolin into very finely-divided aqueous zeolitic sodium aluminosilicate of the NaA type which, on the one hand, permits a continuous process with a high space/time yield and, on the other, leads to low-grit products having a high cation exchange capacity.

Another object of the present invention is the development of an improvement in a continuous process for the conversion of meta-kaolin into an aqueous alkaline suspension of low-grit, water-containing, zeolitic sodium aluminosilicate of the smallest particle size having the molar composition:

0.9 to 1.1 $Na_2O$:1 $Al_2O_3$:1.8 to 2.3 $SiO_2$ with a water content depending on the degree of drying, which contains at least 99.8% by weight of a particle size of less than 25μ and has a high cation exchange capability comprising:
(a) reacting meta-kaolin with sodium hydroxide at elevated temperatures,
(b) in a first aqueous alkaline suspension having a composition corresponding to the molar ratios of:

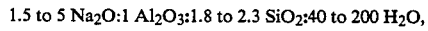
1.5 to 5 $Na_2O$:1 $Al_2O_3$:1.8 to 2.3 $SiO_2$:40 to 200 $H_2O$, and
(c) recovering said aqueous, alkaline suspension of zeolitic sodium aluminosilicate, the improvement consisting of:
(d) slowly heating said first suspension from a charging temperature of 50° C. or below to a zeolitization temperature in the range of from 70° to 100° C., with a temperature rise averaging 20° C. within a period of from two to ten minutes,
(e) feeding the first suspension continuously into a reactor heated to said zeolitization temperature and having progressively, separately zoned mixing areas with a stage-like effect and having at least seven stages while mixing said suspension sufficiently in the respective states to avoid sedimentation,
(f) passing said heating suspension through the reactor at a preselected temperature in the range of from 70° to 100° C. at such a rate and time until the degree of crystallization of the zeolite sodium aluminosilicate, determined by X-ray, has reached at least 80% of the theoretically possible crystallinity, and
(g) continuously removing an aqueous, alkaline suspension of zeolitic sodium aluminosilicate from the end opposite of the intake end of the reactor.

These and other objects of the invention will become more apparent as the description thereof proceeds.

THE DRAWINGS

FIG. 1 is a flow diagram of the process of the invention employing a cascade of agitator vessels having progressively, separately zoned mixing and heating areas, and FIG. 2 is a flow diagram of the process of the invention employing an agitator column having progressively, separately zoned mixing and heating areas.

DESCRIPTION OF THE INVENTION

Accordingly, the invention relates to a process for the continuous conversion of meta-kaolin into very finely-divided, low-grit, zeolitic sodium aluminosilicate of the composition:

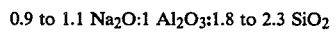
0.9 to 1.1 $Na_2O$:1 $Al_2O_3$:1.8 to 2.3 $SiO_2$ with a water-content depending on the drying, of which at least 99.8% by weight has a particle size of less than 25μ and a high cation exchange capacity and which occurs in the form of an aqueous alkaline suspension:
(a) by reacting meta-kaolin with sodium hydroxide at elevated temperatures,
(b) in an aqueous alkaline suspension which has a composition corresponding to molar ratios of:

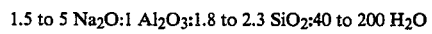
1.5 to 5 $Na_2O$:1 $Al_2O_3$:1.8 to 2.3 $SiO_2$:40 to 200 $H_2O$ and is obtained by mixing meta-kaolin with aqueous soda lye, which is characterized in that:
(c) the suspension is slowly heated from a charging temperature of 50° C. or below to the zeolitization temperature in the range of 70° to 100° C., with a temperature rise averaging 20° C. within two or ten minutes,
(d) the suspension is allowed to flow continuously through a reactor acting in a stage-like manner and/or executed in steps having at least seven stages, it being necessary to mix together the suspension sufficiently in the respective stages to avoid sedimentation,
(e) heated the suspension is passed through the reactor at a temperature of 70° to 100° C. until the X-ray determinable degree of crystallization of the formed zeolitic sodium aluminosilicate has reached at least 80% of the theoretically attainable crystalinity, and thereafter
(f) the obtained suspension of the crystalline zeolitic sodium aluminosilicate is allowed to flow out at the end of the reactor opposite the inlet portion.

More particularly, the present invention relates to an improvement in a continuous process for the conversion of meta-kaolin into an aqueous alkaline suspension of low-grit, water-containing, zeolitic sodium aluminosilicate of the smalles particle size having the molar composition:

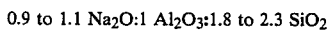
0.9 to 1.1 $Na_2O$:1 $Al_2O_3$:1.8 to 2.3 $SiO_2$ with a water content depending on the degree of drying, which contains at least 99.8% by weight of a particle size of less than 25μ and has a high cation exchange capability comprising:
(a) reacting meta-kaolin with sodium hydroxide at elevated temperatures,
(b) in a first aqueous alkaline suspension having a composition corresponding to the molar ratios of:

1.5 to 5 Na$_2$O:1 Al$_2$O$_3$:1.8 to 2.3 SiO$_2$:40 to 200 H$_2$O, and
(c) recovering said aqueous, alkaline suspension of zeolitic sodium aluminosilicate, the improvement consisting of:
(d) slowly heating said first suspension from a charging temperature of 50° C. or below to zeolitization temperature in the range of from 70° to 100° C., with a temperature rise averaging 20° C. within a period of from two to ten minutes,
(e) feeding the first suspension continuously into a reactor heated to said zeolitization temperature and having progressively, separately zoned mixing areas with a stage-like effect and having at least in the respective states to avoid sedimentation,
(f) passing said heated suspension through the reactor at a preselected temperature in the range of from 70° to 100° C. at such a rate and time until the degree of crystallization of the zeolite sodium aluminosilicate, determined by X-ray, has reached at least 80% of the theoretically possible crystallinity, and
(g) continuously removing an aqueous, alkaline suspension of zeolitic sodium aluminosilicate from the end opposite of the intake end of the reactor.

In the sense of the process of the invention, it is, therefore, of essential importance that the suspension to be zeolitized traverses continuously a reactor having at least seven separately zoned mixing areas or stages. It is immaterial whether the reactor is executed in stages, that is, has discrete stages, and/or only acts in a stage-like manner, as the number of stages of the reactor must be equated in principle with that of an agitator vessel cascade equivalent with respect to the dwell time distribution. Concerning the dependence of the dwell time behavior on the so-called stage or step efficiency of the reactor as well as concerning relationships between actual and theoretical stage number of multi-stage reactors, reference is made to textbooks of industrial chemistry, for example, "Ullmanns Encykopädie der technischen Chemie,"4th Edition, Vol. 3; "Verfahrenstechnik II und Reaktionsapparate,"1973, Verlag Chemie, pp. 342–354, incorporated herein by reference.

In general, the stage number of a continuously operating reactor can be considered a measure of the amount in which portions of the product are ahead of the main front of the product or flow back with respect to it, and thus a measure of the mixing in the direction of the flow. The greater the number of stages in the reactor, the lower the extent of mixing between the individual volume elements of the suspension to be crystallized in the flow direction. In the process according to the invention, the suspension crystallizes in the flow direction. In the intake section of the reactor, the alkaline suspension of the meta-kaolin is fed in continuously; at the outlet, the suspension of the crystallized sodium aluminosilicate is discharged continuously. A reduced mixing of the volume elements in the flow direction thus means a reduced interaction of sodium aluminosilicate particles of different degrees of crystallinity.

It was surprising to observe that it is very important in the sense of the process according to the invention that the back-mixing of already crystallized product with meta-kaolin, especially in the first third of the crystallizing section, be suppressed or that the interaction of sodium aluminosilicate particles of higher crystallinity with those of lower crystallinity is prevented as much as possible.

In this way the process according to the invention results in crystalline zeolitic sodium aluminosilicates of the smallest particle size, which are characterized by a very small amount of grit and a narrow grain spectrum with a low mean grain size, on the one hand, and by a high cation exchange capability, on the other. Furthermore, the high volume/time yield that can be achieved by this continuous process is of special advantage. In this sense it is preferable, according to the invention, that the suspension is allowed to flow into the reactor with a throughput in the range from 1 to 3 cubic meters of suspension per cubic meter of reactor volume and per hour.

According to the invention, an aqueous alkaline meta-kaolin suspension having a composition according to molar ratios of:

1.5 to 5 Na$_2$O:1 Al$_2$O$_3$:1.8 to 2.3 SiO$_2$:40 to 200 H$_2$O is zeolitized. The preparation of such a meta-kaolin suspension, by mixing meta-kaolin with aqueous sodium hydroxide in a concentration required for attaining the above stated molar ratio, can be effected in different ways. Thus, for example, the hot meta-kaolin obtained in the continuous calcining of kaolin can be mixed directly with a continuous stream of dilute soda lye. But on the other hand, previously destructurized meta-kaolin, cooled again by intermediate storage after completed calcining, can also be used according to the invention. In this case, dilute aqueous sodium hydroxide, preferably formed from technical soda lye, deionized water and/or recycled mother liquor including concentrated wash waters from preceding meta-kaolin conversions, is expediently charged in a continuous stream and meta-kaolin is introduced therein likewise continuously. The mixing is effected according to the invention to advantage in a separate mixing section preceding the zeolitizing reactor and provided with suitable stirring means.

In the sense of the invention it is of essential importance that the formed meta-kaolin suspension at a temperature of 50° C. or below, such as a temperature of from 20° C. to 50° C., preferably from 25° C. to 43° C., is heated slowly to the required zeolitizing temperature in the range of 70° to 100° C. By "slowly" is meant that one effects a temperature rise of the suspension of 20° C. as an average within two to ten minutes. In this way, on the one hand, the thickening stage possibly occurring during the conversion of meta-kaolin with soda lye, that is, a rise in viscosity, can be reduced and also, on the other hand, an increased degree of crystallization of the formed zeolite can be achieved. An increased degree of crystallization, in turn, brings about in particular an increased cation exchange capacity of the zeolite, which the invention strives for.

The heating of the suspension can be effected either indirectly or by injection of steam into the suspension. In the interest of continuous operation, it is preferred, according to the invention, to perform the heating of the suspension to the desired zeolitizing temperature inside the zeolitizing reactor. The heating is done in the inlet portion of the reactor, which is followed by the essential portion of the reactor, which is necessary according to the invention and which comprises at least seven steps.

In the sense of the process of the invention, the alkaline meta-kaolin suspension is maintained in a state of flow in the reactor at a zeolitizing temperature of 70° to 100° C. until the X-ray or roentgenographically determinable degree of crystallization of the formed zeolitic sodium aluminosilicate has reached at least 80% of the theoretically attainable crystallinity. Expediently the meta-kaolin suspension should be mixed together in the entire reactor sufficiently to prevent sedimentation thereof. With reactors having stages, this can be achieved, for example, by suitable agitators disposed in the individual stages of the reactor.

The zeolitizing reactor may further be surrounded wholly or partly by a heating jacket for steam, hot water, or other common heat transfer media. In this manner, the continuous zeolitization can be carried out under largely isothermic conditions, that is, with a tolerance of ±2° C. In the interest of the high space/time yield attainable with this continuous process, it is especially preferred according to the invention to let the suspension flow through the reactor at a rate in the range of from 1 to 3, preferably 1 to 2 cubic meters of suspension per cubic meter reactor volume and per hour.

With respect to the selection of an optimum zeolitizing temperature, furthermore the composition of the aqueous alkaline meta-kaolin suspension is of importance, the water content in particular being a determining factor. At a higher water content of the suspension, higher, and at a lower water content, lower zeolitizing temperatures are of advantage. In this sense, it is preferred according to the invention to subject a suspension of the molar composition:

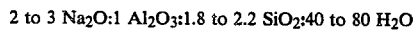

2 to 3 $Na_2O$:1 $Al_2O_3$:1.8 to 2.2 $SiO_2$:40 to 80 $H_2O$ to the reaction at a temperature ranging from 75° to 95° C. In this way, in particular the formation of noncation-exchanging, usually feldsparoid by-products, can be suppressed to a large extent.

As zeolitizing reactors in the sense of the invention, one can use generally those reactors which permit continuous introduction of the meta-kaolin suspension as well as continuous discharge of the crystallized suspension and which have the required number of stages. Such reactors are known in themselves and have been described in textbooks of industrial chemistry, for example, in the above-cited "Ullmann" volume.

The total volume of the zeolitizing reactor to be used, and hence also its dimensions, are determined by the desired throughput of meta-kaolin suspension.

To carry out the process of the invention, one uses as zeolitizing reactors preferably agitator vessel cascades, agitator columns or flowing tube reactors.

According to a preferred form of realization of the process of the invention, the conversion is effected in closed vessels, connected together by pipelines and provided with stirring devices, of an agitator vessel cascade comprising at least seven vessels. As reactor executed in stages in the sense of the invention, therefore, an agitator vessel cascade is used where the individual vessels of the cascade represent the respective stages of the reactor.

The agitator vessel cascade is a series connection of continuously operated ideal closed vessels. The reaction partners or, respectively, their mixture are fed continuously into the first vessel, and the final mixture containing the reaction products is drawn continuously from the last vessel. The product stream of the preceding vessel constitutes the inflow stream for the next following vessel. For each individual vessel, there then applies the characteristic of the ideal closed vessel as of a homogeneous and stationary reactor. For the entire cascade there results a stepped concentration pattern of the reaction participants. Information on the design and operation of ideal closed vessels and agitator vessel cascades, including their mathematical treatment, can be found in textbooks of industrial chemistry, for instance, the above-cited literature reference "Ullmanns Encyklopädie der technischen Chemie."

The most important feature of the ideal agitator vessel is the mixing. The mathematical description of the ideal agitator vessel is based primarily on the assumption of complete mixing of the vessel content, that is, that the reaction mixture at the vessel outlet and in the vessel itself has the same composition. A prerequisite for the stipulated complete mixing of the reaction partners in the ideal agitator vessel is good agitation; otherwise a part of the reaction liquid could flow directly from the vessel inlet to the vessel outlet, and a large part of the vessel content would simply be dead volume.

In reality, the prerequisite of ideal blending is fulfilled only approximately. The mixing time within which the content of an agitator vessel is homogenized can be calculated for various conditions. Ideal blending exists in practice when the mean residence time in the vessel is substantially longer than the mixing time. According to experience, an ideal situation is sufficiently approximated when the mean residence time is about five to ten times as long as the calculated mixing time.

In the layout of agitator vessel cascades scale is of no importance if ideal flow as described above exists. The quantity essential in this respect is the mean residence time, by which reactors of any size are described. For the actual case, however, it must be noted that the mixing time as well as the ratio of surface to volume of the vessel depend on the size of the vessel. This ratio has a decisive influence on the heat inflow and outflow, as the quantity of heat to be transported through the vessel wall is proportional to the vessel surface, while the heat of reaction is proportional to the vessel volume utilized. For the layout of agitator vessel cascades, therefore, one must examine whether the mixing time is, as stipulated above, very short relative to the mean residence time.

Optimization of an agitator vessel cascade is possible from several points of view. Under the aspect of process technology, it is usually of importance that the ratio of the volumes of the individual vessels must be so that either the cascade has the smallest total volume at a given rate of conversion or that the highest rate of conversion is reached in a cascade of given total volume. For most chemical reactions, in view of the respective velocity laws, all agitator vessels must have the same volume. For reasons of standardization, agitator vessel cascades with uniform vessels are preferred for reactions of any order. Further possibilities of optimization result from criteria of profitability and from criteria for optimum conduction of the reaction.

According to a further preferred form of realization of the process of the invention, the reaction is carried out in a preferably vertical agitator column, which is subdivided by suitable intermediate partitions or trays into at least seven chambers. As reactor executed in stages in the sense of the invention, therefore, an agitator column is used, the respective stages of the reactor being formed by the installed intermediate trays.

Agitator columns consist of a cylindrical reactor which is subdivided by partitions into chambers of preferably equal size. This reactor type is therefore sometimes called "chamber reactor" in the literature. In analogy to distillation columns, the partitions in agitator columns are also called "trays." Likewise also the number of stages is defined analogously as the product of (actual) number of trays times stage efficiency (see textbooks of industrial chemistry). The distance apart of the trays, that is, the height of the chambers, is, in the usual type of agitator columns with many trays, in the range of 0.35 to 0.5 times the reactor diameter.

The agitators for the individual chambers are mounted jointly on a shaft in the column axis. The bearings or suspensions are normally located at the ends; only for especially long agitator shafts, an intermediate bearing is technically meaningful. With respect to type and size of the agitators, their energy requirement, flow disturbers and the like, the layout of the agitators may be very different. The calculation of the mean residence time, residence time distribution and concentration of the reactants in an agitator column is identical with that for an agitator vessel cascade of the same number of stages. However, higher numbers of stages can be realized with an agitator column at less expense. In agitator columns, the liquid passes from chamber to chamber through openings in the trays. Agitator columns can be operated in any desired orientation in space, that is, in vertical, horizontal, or oblique arrangement. Preferably, however, they are run with liquid rising from the bottom up. Details and special designs can be found in textbooks of industrial chemistry, for example, the above-cited literature reference "Ullmanns Encyklopädie der technischen Chemie."

According to the invention, the alkaline metakaolin suspension is introduced continuously into the lowest chamber at the bottom of the vertical column by means of appropriate metering devices. The agitator column used should have at least six, but preferably a larger number of intermediate bottoms. In view of the desired mean residence time, as discussed above, of the reaction partners in the column, the circumferential speed of the agitators can be limited to less than six meters per second, possibly even to less than four meters per second, depending on the type of agitator.

According to the third preferred form of realization of the process of the invention, the reaction is carried out in a flowing tube reactor which has a ratio of tube length to tube diameter in the range of 3,000 to 7,000, preferably 5,000. As reactor acting in stages in the sense of the invention there is used, therefore, a flowing tube reactor, the required stage-like nature of the reactor being obtained by the above-stated ratio of tube length to tube diameter.

In the flowing tube reactor (also called "flow tube"), the reaction volume is formed by a tube whose length is, as a rule, very great by comparison with its diameter. The reactants enter at one end of the tube. The final mixture is discharged at the other end. In the ideal flowing tube reactor, no mixing takes place between the individual volume elements of the reaction mixture, in the direction of the flow, and the composition of the reaction mixture is constant across its cross-section at every point of the tube. These conditions can be described in first approximation by the assumption of a so-called piston or plug flow. The changes of concentration along the tube (i.e., mixing) are dependent on the throughput.

Furthermore, it can be said of the flowing tube reactor that in each cross-section of the tube as perfect as possible a mixing results in radial direction. In this way in the sense of the invention the mixing together of the suspension required for avoiding sedimentation is achieved.

The residence time distribution of an actual flowing tube reactor differs from that of an ideal one and depends on the Reynolds number, tube bends, tube profile, tube baffles, inside surface roughness, flow conditions at the inlet and outlet of the tube, viscosity differences of the reaction mixture and similar parameters. Knowledge about the residence time distribution in a given flowing tube reactor can be obtained either by measurement or by selecting the operating conditions so that they are largely ideal.

Data concerning the construction and operation of flowing tube reactors including their mathematical treatment can be found in textbooks of industrial chemistry, such as the above-cited "Ullmann" volume.

In the practice of the process of the invention there results, after completed zeolitization, an aqueous alkaline suspension of very finely divided crystalline zeolitic sodium aluminosilicates of the NaA type, which excel, on the one hand, by their grit fraction of less than 0.2% by weight and a narrow grain spectrum of small grain size and, on the other hand, by a high cation exchange capacity.

As a rule, the suspension of crystalline zeolite produced according to the invention is processed further. To this end, for example, the crystalline solid is filtered, washed and dried or, depending on the desired purpose of use, treated in other customary ways. Thus, if desired, an aqueous suspension of the crystalline sodium aluminosilicate can be used for the production of detergent rinsing and cleansing agents. The mother liquor and wash waters are advantageously returned into the production process.

Because of the high cation exchange capacity of the obtained zeolitic sodium aluminosilicate, which is reflected in a calcium binding capacity (CaBC) in the range of 150 to 170 mg CaO/gm of zeolite, these zeolites are used preferably as heterogeneous inorganic builders (phosphate substitutes) in detergents, rinsing and cleansing agents.

The kaolinic aluminosilicates used for conversion into zeolitic sodium aluminosilicates always have a content of impurities, such as CaO, MgO, $TiO_2$, $Fe_2O_3$ and similar metal oxides. Among these impurities, especially iron oxide has an adverse effect in the later use of the obtained zeolite, for example, when the zeolite is used as a catalyst in chemical processes. Highly iron-containing zeolites can further have a destabilizing effect on likewise present per-compounds when used in detergents. If, therefore, especially low-iron zeolitization products are desired for technical reasons, various measures can be taken to reduce the iron content.

For one thing, low-iron kaolins, having an iron content of below 0.5% by weight of $Fe_2O_3$ based on anhydrous kaolin, are used from the start. Also technically possible is the separation of iron-containing accompanying minerals from the kaolin by the use of magnetic separators. Reduction of the iron content in the kaolin, or, respectively, a proportional increase of the whiteness, can be obtained also by simultaneous action of reducing agents and organic resin exchangers in acid suspension. Almost totally iron-free meta-kaolin is obtained by the action of chlorinating gases, such as hydrogen chloride or phosgene, on the kaolin during calcining. Under these conditions, the iron is transformed into iron (III) chloride and driven off. Such meta-kaolin grades of low iron content can be used without restriction for the process of the invention.

Secondly, a distinct reduction of the residual iron content of the resulting zeolite can be obtained in the process of the invention also by adding trialkanolamine to the meta-kaolin suspension and allowing it to act analogously as described in U.S. Pat. No. 4,089,929 during the zeolitization.

The following examples further explain the conduction of the process according to the invention without being limitative thereto.

EXAMPLES

In the following examples there were used, as mixers with a stage-like effect, an agitator vessel cascade (Examples 1A to 1E), an agitator column (Examples 2A to 2F), as well as a flowing tube reactor (Example 3). Statements applicable to all examples equally are given below in a summary fashion.

The kaolin used in the examples was exclusively of the grade Bolus alba having a molar ratio of:

$SiO_2:Al_2O_3 = 2.03$ and a water content of 13.1%. The following were determined by X-ray fluorescence analysis (data as oxides):

| $Na_2O$ | 0.07% | $TiO_2$ | 0.09% |
|---|---|---|---|
| $K_2O$ | 1.01% | CaO | 0.2% |
| $Fe_2O_3$ | 0.56% | MgO | 0.2% | as secondary components of this kaolin.

The destructurization of this kaolin was carried out by continuous calcination using a rotating tube furnace (tube length 1.8 m, of which 1.1 m was heated, inside diameter 83 mm) with electric external heating at temperatures in the range of 850° to 900° C. With an angle of inclination of the rotating tube of 4° and a rotational speed of 12 revolutions per minute, the mean residence time of the kaolin in the rotating tube was only about five minutes. This calcined material was used in the examples as meta-kaolin.

In all examples, the test sequence consisted of a mixing stage, the heating stage, and the actual zeolitizing stage in the reactor.

In all cases an open 100-liter vessel was used as the mixing reactor. Into it were pumped continuously 50% technical soda lye and deionized water, the meta-kaolin was metered in via a vibratory chute. Per unit time these reaction partners were introduced into the mixing reactor continuously and uniformly in quantities such that the formulation ratios and throughputs stated in the examples resulted. The actual zeolitizing, that is, the introduction of the meta-kaolin suspension into the zeolitizing reactor, was always begun only after about 100 liters of suspension were present. In this manner, minor dosage and temperature fluctuations were equalized. The suspension was stirred continuously with an Ekato agitator with toothed disk agitator shaft (disk diameter 18 cm, 500 rpm).

From this mixing stage, the suspension at a charging temperature of from 20° C. to 50° C., preferably from 25° C. to 43° C., was pumped into the heating stage by means of a metering piston pump. The heating stage was integrated in the zeolitizing reactor, ordinarily in the first third of the zeolitizing reactor. Heating to the stated zeolitizing temperature was always effected with saturated, finely dispersed steam. The amount of water thus additionally introduced into the suspension was in all examples about 4 mols of $H_2O$ per mol of $Al_2O_3$.

After passing the heated suspension in the zeolitizing reactor for a test duration of about one and a half hours, samples of about 1 liter suspension were taken from the continuous product stream. The solid was suction-filtered and washed with deionized water of 60° C. until the wash water had a residual alkalinity corresponding to pH 9.

For their characterization the washed products were dried overnight at 100° C. in a vacuum drying cabinet and triturated well. The substances were identified first by means of their X-ray diagram. With respect to $Na_2O$, $SiO_2$ and $Al_2O_3$, the composition was determined by X-ray fluorescence analysis. The water content was determined by the loss on ignition after one hour at 800° C. The crystal habit was determined with a grating electron microscope, the grain size distribution was measured with a Coulter Counter ®, and the wet screening residue according to Mocker was established using a 25μ screen according to DIN 53 580 (1 gm of active substance suspended in 100 ml of deionized water, homogenized for one minute in an ultrasonic bath, wet screened for five minutes at a water pressure of 4 bar and a flow velocity of 400 liters of water per hour; and reweighing of the screens after being dried at 110° C. in the drying cabinet).

In the modified determination of the grit content there was used accordingly a test screen of a mesh width of 50μ (DIN 4188). The product sample suspended with water was here whirled up with the aid of water sprayed out of rotating nozzles. The fine fractions of the sample to be tested were thus washed through the test screen without pressure. The wet screening was stopped after two minutes at a spraying rate of 80 liters per hour, and the screen residue was determined as stated.

To measure the cation exchange capacity of the crystalline zeolitic material, the calcium binding capacity is used, where 1 gm of sodium aluminosilicate (active substance=AS) per liter at a starting hardness of 30°d (German hardness) is employed. To determine the calcium binding capacity, 1 liter of an aqueous solution containing 0.594 gm of $CaCl_2$ (corresponding to 300 mg CaO/liter=30°d) was adjusted with dilute sodium hydroxide solution to a pH value of 10 and mixed with 1 gm AS. Then the formed suspension was vigorously stirred for 15 minutes at a temperature of 22°±2° C. The sodium aluminosilicate having been filtered off, the residual hardness X was determined in the filtrate by complexometric titration by means of ethylenediamine tetraacetic acid. The calcium binding capacity (CaBC) is calculated therefrom in mg CaO/gm As according to the formula: $(30-X) \times 10$.

The conduction of the examples is described in the following. The properties of the products obtained from these examples are evident from Table 1.

Since in all examples the same meta-kaolin grade was used, the chemical composition of the resulting products with respect to the main components was remarkably constant. In all products the composition corresponded to molar ratios of:

0.97 to 1.04 $Na_2O.Al_2O_3.2.15$ to 2.25 $SiO_2$ with a water content depending on the degree of dryness according to Table 2. The iron content ranged from 0.35% to 0.43% $Fe_2O_3$ relative to the anhydrous products, except for product from triethanolamine-containing suspension according to Example 2E with 0.11% $Fe_2O_3$ relative to active substance. The grating electron microscope photographs always showed well developed crystallites of an edge length between 0.5 and 2.0$\mu$ with a distribution maximum of about 1$\mu$.

All products showed the position and relative intensity of the X-ray reflections characteristic of zeolite of the NaA type. On the basis of these X-ray diffractograms, crystalline impurities in appreciable quantity can be ruled out. The grating electron microscope photographs always showed well developed crystallites of a shape typical for zeolite NaA. In Table 1, the charging amounts and the average heating rates from charging temperature to the zeolitization temperature are given.

EXAMPLES 1A TO 1E

For the conduction of the following examples, an agitator vessel cascade with 10 closed vessels supplied with agitators was used, the arrangement of which is shown in simplified form in FIG. 1.

The agitator vessels 1 to 10 were equipped with jacket heating and identical agitating systems, had the same form and size (diameter 30 cm, height about 60 cm) and had a useful reactor volume (to the overflow) of about 40 liters. For the blending of the reaction mixture in vessels 1 to 10, standardized agitators 11 with flow disturbers were used at a constant circumferential velocity of 5 meters per second.

In Examples 1A and 1B, 272.7 kg of technical soda lye, 136.3 kg of meta-kaolin, and 409 liters of deionized water per hour were supplied to the mixing stage continuously and uniformly. From this there resulted molar ratios in the charging materials of:

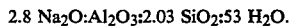

2.8 $Na_2O:Al_2O_3:2.03\ SiO_2:53\ H_2O$.

About ten minutes after the start of the filling of the mixing stage, a quantity of 600 liters per hour, corresponding to 818 kg per hour, was pumped into boiler 1 of the cascade continuously from the suspension already accumulated.

In Examples 1C and 1D, 173.4 kg of technical soda lye, 72.3 kg of meta-kaolin and 491.7 liters of deionized water per hour were similarly mixed to resultant molar ratios of:

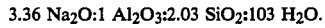

3.36 $Na_2O:1\ Al_2O_3:2.03\ SiO_2:103\ H_2O$.

Of this again 600 liters or 737.4 kg of suspension per hour were pumped into boiler 1 of the cascade after ten minutes.

The stepwise heating of the kaolin suspension from the charging temperature of about 25° to 30° C. in the mixing stage to the zeolitizing temperature was effected by injection of steam into the vessels 1, 2 and 3 in addition to the jacket heating at 90° C. The feeding of steam was regulated so that independently of the proportioning there resulted in boiler 1 a temperature of 51° C., in boiler 2, 69° C., and the boiler 3, 88° C., each ±2° C. The suspensions of crystallized product, always sampled at the outflow of the cascade, consistently showed temperatures of 89° to 90° C.

In Examples 1A to 1D, therefore, only vessels 4 to 10 were used for the actual zeolitization.

COMPARISON EXAMPLE 1E

The agitator vessel cascade described in examples 1A to 1D was used as a continuous reactor. The combination of the reaction mixture presented referring to sodium hydroxide solution, meta-kaolin and water corresponds to examples 1C and 1D. From this, after 10 minutes of preliminary running time, 600 liters per hour, corresponding to 747.4 kg of suspension, were pumped into vessel 1 of the cascade.

The step by step heating of the kaolin suspension from the charging temperature of 38°±2° C. in the mixing step up to the zeolitization temperature was caused by injection of steam into vessels 1 to 7 in addition to a heating of the shell to 90° C. The influx of steam was so regulated that temperatures of 45°±2° C. at vessel 1, 52°±2° C. at vessel 2, 59°±2° C. at vessel 3, 67°±2° C. at vessel 4, 74°±2° C. at vessel 5, 81°±2° C. at vessel 6 and 88°±2° C. at vessel 7 resulted. The crystallized suspension taken up at the outlet of the agitator vessel cascade showed a temperature of 89° to 90° C.

Because of the heating which was too slow (average heating time for 20° C. was 11.2 minutes), completely inadequte product characteristics were obtained in this comparison example. The proportion of particle size greater than 25 $\mu$m amounted to 0.3 weight percent; the calcium binding capacity was under 100 mg CaO/g active substance.

EXAMPLES 2A TO 2F

For Examples 2A to 2C an agitator column of a useful capacity of about 200 liters was used. The column had a total length of 3.7 m and was operated by filling from the bottom up. A total of 28 chambers were formed by 27 intermediate trays (see FIG. 2). The chambers 2 to 12 in the inlet portion were 11 cm high, while the chambers 13 to 27 were 14 cm high (always inside clear height). The chambers 1 and 28 (reactor intake and outlet, respectively) contained the agitator bearings and were, therefore, a little larger (about 15 cm high). The intermediate trays had concentric openings of a diameter of 0.5 times the inside diameter of the column; the disks located above at a distance of about 1 mm each had a diameter of 0.7 times the inside diameter of the column (inside column diameter =27 cm). The agitator shaft carried the stirrers for each of the chambers (MIG agitators manufactured by EKATO, agitator diameter=0.7 times inside column diameter). The agitator speed was infinitely variable to an agitator speed of 480 rpm at the agitator motor 29. All examples of crystallization were carried out at a constant speed of 312 rpm. The entire column was heated with steam through a jacket (3 zones) to 95°±1° C. (in Example 2E to only 85°±1° C.).

Chambers 1, 2, 3, 5 and 7 had pipe connections 30 to 34 for injection of steam. Chambers 14 and 21 contained devices 35 and 36 for removal of suspension from the product stream.

In Example 2A there were supplied to the mixing stage continuously and uniformly per hour 111.4 kg of technical soda lye, 55.7 kg of meta-kaolin and 222.9 kg of deionized water to supply a resultant total molar ratio of:

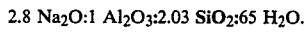
2.8 Na$_2$O:1 Al$_2$O$_3$:2.03 SiO$_2$:65 H$_2$O.

About 20 minutes after start of filling the mixing stage, a stream of 300 liters per hour or about 390 kg per hour was pumped from the already accumulated suspension into chamber 1 of the agitator column. The direct heating of the suspension at a mixing temperature of about 40° C., by injection of steam occurred stepwise in chamber 1 (rise to 60° C.±2° C.), chamber 3 (rise to 70° C.±2° C.), chamber 5 (rise to 80°±2° C.) and chamber 7 (rise to 88°±2° C.). The temperature of the suspension at the column outlet was 92°±1° C. Here suspension containing Product 2A was tapped.

In Example 2B, with equal molar ratios in the formulation, only ⅔ of the above-stated quantities of the charged substances were dosed. About 30 minutes after start of filling of the mixing stage, a stream of 200 liters per hour or about 260 kg per hour was conveyed from the accumulated suspension into chamber 1 of the column. The stepwise heating of the suspension from the mixing temperature (37° C.) was effected by injection of steam in chamber 1 (rise to 61°±2° C.), chamber 2 (rise 75° C.±2° C.), and chamber 3 (rise to 92° C.±2° C.). Suspension containing Product 2B was tapped at chamber 21 at a temperature of 94° C.±1° C.

In Example 2C the procedure was the same as in Example 2B, except that the product was tapped only at the column outlet. The temperature of the suspension was again 94° C.±1° C.

In Example 2D, there were mixed per hour 140 kg of technical soda lye, 87.5 kg of meta-kaolin, and 212.5 kg of deionized water to resultant total molar ratio of:

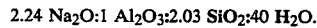
2.24 Na$_2$O:1 Al$_2$O$_3$:2.03 SiO$_2$:40 H$_2$O.

After a mixing time of 20 minutes, 286 liters of suspension having a temperature of 43° C. were pumped per hour into chamber 1 of the column, being heated with steam stepwise by about 14° C. each time in chambers 1, 2 and 3 to a final temperature of 85° C.±1° C. The indirect heating through the column jacket was likewise effected at 85° C.±1° C. At the outlet of the column, suspension of a temperature of 85° C.±1° C. was tapped and from it Product 2D was processed according to Table 1.

In Example 2E, the zeolitization was carried out in the presence of an iron-complexing additive. Besides 136.4 kg of technical soda lye, 68.2 kg of meta-kaolin and 204.5 kg of deionized water per hour, corresponding to resultant total molar ratio of:

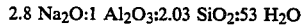
2.8 Na$_2$O:1 Al$_2$O$_3$:2.03 SiO$_2$:53 H$_2$O there were added to the mixing stage per hour also 3.4 kg of triethanolamine. After a preparatory time of 20 minutes, a flow of 412.5 kg per hour was pumped from the suspension collected in the mixing vessel into chamber 1 of the column. Heating was done as in Example 2A. Suspension-containing Product 2F was tapped accordingly at the column outlet at a temperature of 92° C.±1° C.

Compared with the other examples, this product showed a clearly reduced iron content of 0.11% Fe$_2$O$_3$, based on anhydrous substance.

COMPARISON EXAMPLE 2F

The agitator column described in examples 2A to 2E was used as a continuous reactor. A reaction mixture with a combination corresponding to example 2A to 2C of, however, 400 liters per hour was dosed into chamber 1 of the agitator column. The direct heating of the suspension from about 33° C. charging temperature by injection of steam was caused step by step in chamber 1 (rising to 52°±2° C.), chamber 2 (rising to 71°±2° C.), chamber 3 (rising to 88°±2° C.). The temperature at the outlet of the agitator column came to 92°±1° C. The suspension taken from the outlet of the agitation column contained a product with a sufficiently high CaBC of 148 mg CaO/g active substance. However because of the very high grit proportion of 0.3 weight precent residue on the 50 μm sieve 2.2 weight percent on the 25 μm sieve, this product did not meet the specifications for use in commerical products.

EXAMPLE 3

For the conduction of Example 3, a flowing tube reactor of a total volume of about 200 liters and a tube diameter (inside) of 38 mm was used. 44 U-shaped bends at intervals of about 4 meters apart made the reactor compact and the reactor required a floor area of only 20 square meters. The flowing tube reactor was completely enclosed by a heating jacket (hot water), which was subdivided into ten zones for variable heating (but in the example, the zeolitizing temperature of 95° C. was always maintained). A flow diagram of such a flowing tube reactor is described in the specification and drawing in U.S. Pat. No. 4,278,649, and incorporated herein by reference.

In the mixing reactor there were mixed continuously and uniformly per hour 57.4 kg of technical soda lye, 24.3 kg of meta-kaolin and 164.3 kg of deionized water to the resultant total molar ratio of:

3.36 Na$_2$O:1 Al$_2$O$_3$:2.03 SiO$_2$:100 H$_2$O.

The mixing reactor having been filled in about one and a half hours, there were pumped from it 200 liters of suspension or 246 kg per hour at a temperature of 27° C. into the flowing tube reactor. Direct heating with steam in steps of about 13° C. each to 92° C.±2° C. occurred through five pipe connections arranged one behind the other at intervals of about 6 meters downstream. Product suspension of a temperature of 95° C.±1° C. was tapped at the outlet of the flowing tube reactor.

TABLE 1

| Example | Charge l/h | Average Residence in the Reactor (min.) | Δ T (°C.) | Heating length % of total reactor space[1] | Heating time (min.) | Heating time/20° C. (min.) |
|---|---|---|---|---|---|---|
| 1A – 1D | 600 | 40 | 60 | 30.00 | 12.0 | 4.00 |
| | | | 65 | | | 3.69 |
| 2A | 300 | 40 | 48 | 22.44 | 8.98 | 3.74 |
| 2B + 2C | 200 | 60 | 55 | 10.25 | 6.15 | 2.24 |
| 2D | 286 | 42 | 42 | 10.25 | 4.30 | 2.05 |
| 2E | 300 | 40 | 48 | 22.44 | 8.98 | 3.74 |

TABLE 1-continued

| Example | Charge l/h | Average Residence in the Reactor (min.) | Δ T (°C.) | Heating length % of total reactor space[1] | Heating time (min.) | Heating time/20° C. (min.) |
|---|---|---|---|---|---|---|
| 3 | 200 | 60 | 65 | 17.00 | 10.20 | 3.14 |
| 1E (Comparison) | 600 | 40 | 50 | 70.00 | 28.00 | 11.20 |
| 2F (Comparison) | 400 | 30 | 55 | 10.25 | 3.08 | 1.12 |

[1]based on the total volume and by this, the average residence time in the continuous reactor:
Cascade: 3 vessels out of a total of 10 vessels correspond to 30%
Column: Chambers 1–3 correspond to 10.25%, Chambers 1–7 correspond to 22.44% of the height of the column; Chambers 1–3 are (15 + 11 + 11 =) 37 cm high; Chambers 1–7 are (15 + [6 × 11] =) 81 cm high; based on the total (2 × 15) + (11 × 11) + (15 × 14) = 361 cm total column height.

TABLE 2

| Product from Example | CaBC | % H₂O | Weight % Grit 50μ Screen* | 25μ Screen** | Grain Size Distribution*** (Volume %) >3μ | >5μ | >7μ | >10μ | Distribution Density Maximum in μ**** |
|---|---|---|---|---|---|---|---|---|---|
| 1A | 125 | 11.5 | 0.04 | — | 91 | 51 | 28 | 5 | 4.0–5.0 |
| 1B | 143 | 15.4 | 0.05 | — | 81 | 21 | 8 | 3 | 4.0–5.0 |
| 1C | 115 | 11.2 | 0.08 | 0.05 | 98 | 74 | 58 | 19 | 6.3–7.9 |
| 1D 1E comparison | 128 <100 | 12.4 | 0.11 | 0.10 0.30 | 94 | 72 | 55 | 21 | 6.3–7.9 |
| 2A | 152 | 12.4 | <0.02 | — | 71 | 23 | 9 | 2 | 4.0–5.0 |
| 2B | 140 | 13.4 | <0.02 | — | 83 | 31 | 12 | 3 | 4.0–5.0 |
| 2C | 154 | 14.9 | <0.02 | — | 81 | 44 | 25 | 5 | 4.0–5.0 |
| 2D | 147 | 14.1 | 0.05 | — | 66 | 21 | 9 | 3 | 3.2–4.0 |
| 2E 2F comparison | 135 148 | 14.2 | 0.15 0.30 | 0.10 2.20 | 97 | 86 | 73 | 43 | 6.3–7.9 |
| 3 | 155 | 15.8 | <0.02 | — | 73 | 22 | 10 | 2 | 4.0–5.0 |

*Determined pressure-free
**Water pressure 4 bar
***Determined with Coulter Counter ®
****Position of the Counter Counter ® channel in which the maximum occurred.

The Table shows that zeolitic sodium aluminosilicate of the type NaA was obtained in a continuous basis, with a low grit and a high calcium binding capacity under the various conditions studied.

The preceding specific embodiments are illustrative of the practice of the invention. It is to be understood, however, that other expedients known to these skilled in the art or disclosed herein, may be employed without departing from the spirit of the invention or the scope of the appended claims.

We claim:

1. In a continuous process for the conversion of meta-kaolin into an aqueous alkaline suspension of low-grit, water-containing, zeolitic sodium aluminosilicate of the smallest particle size having the molar composition:

0.9 to 1.1 Na₂O:1 Al₂O₃:1.8 to 2.3 SiO₂ with a water content depending on the degree of drying, which contains at least 99.8% by weight of a particle size of less than 25 μ and has a high cation exchange capability comprising:

(a) reacting meta-kaoline with sodium hydroxide at elevated temperatures,
(b) in a first aqueous alkaline suspension having a composition corresponding to the molar rations of:

1.5 to 5 Na₂O:1 Al₂O₃:1.8 to 2.3 SiO₂:40 to 200 H₂O, and
(c) recovering said aqueous, alkaline suspension of zeolitic sodium aluminosilicate, the improvement consisting of:
(d) slowly heating said first suspension from a charging temperature of 50° C. or below to a zeolitization temperature in the range of from 70° C. to 100° C., with a temperature rise averaging 20° C. within a period of from two to ten minutes,
(e) feeding the first suspension continuously into a reactor heated to said aeolitization temperature and having progressively, separately zoned mixing areas with a stage-like effect and having at least seven stages while mixing said suspension sufficiently in the respective stages to avoid sedimentation,
(f) passing said heated suspension through the reactor at a preselected temperature in the range of from 70° C. to 100° C. at such a rate and time until the degree of crystallization of the aeolitic sodium aluminosilicate, determined by X-ray has reached at least 80% of the theoretically possible crystallinity, and
(g) continuously removing an aqueous, alkaline suspension of zeolite sodium aluminosilicate from the end opposite of the intake end of the reactor.

2. The process of claim 1 wherein said alkaline suspension of the meta-kaolin in continuously fed into said crystallizing reactor and a suspension is continuously removed at a throughput in the rang or from 1 to 3 cubic meters of suspension per cubic meter of reactor volume and per hour.

3. The process of claim 2 wherein said throughput is in the range of from 1 to 2 cubic meters of suspension per cubic meter of reactor volume and per hour.

4. The process of claim 1 wherein said first alkaline suspension of meta-kaolin at a charging temperature of from 25° to 43° C. is heated by steam injection to said zeolitization temperature at least by the time it leaves the first third of the reactor.

5. The process of claim 4 wherein said heating by steam injection occurs after said suspension in introduced into said reactor.

6. The process of claim 1 wherein said first aqueous alkaline suspension has a composition corresponding to the molar ratios of:

2 to 3 Na$_2$O:1 Al$_2$O$_3$:1.8 to 2.2 SiO$_2$:40 to 80 H$_2$O and said zeolitization temperature is in the range of 75° C. to 95° C.

7. The process of claim 1 wherein said alkaline suspension of meta-kaolin is continuously fed into individual vessels of an agitator vessel cascade comprising at least seven vessels fluidly interconnected with the next adjacent vessels and each supplied with agitators, as said reactor having progressively separately zoned mixing areas.

8. The process of claim 1 wherein said alkaline suspension of meta-kaolin is continuously fed into an agitated vertical column divided by trays into at least seven separated, agitated chambers, fluidly interconnected with the next adjacent chambers, as said reactor having progressively, separately zoned mixing areas.

9. The process of claim 8 wherein the height of said separated, agitated chambers is from 0.35 to 0.7 times the inside longest cross-section dimension of said chamber.

10. The process of claim 9 wherein said separated, agitated chambers have a circular cross-section.

11. The process of claim 1 wherein said alkaline suspension of meta-kaolin is continuously fed into the entrance of an elongated substantially circular cross-sectional reaction zone having a ratio of length to diameter of from 3,000 to 7,000 as said reactor having progressively, separately zoned mixing areas.

12. The process of claim 11 wherein the ratio of length to diameter is about 5,000.

13. In a continuous process for the conversion of meta-kaolin into an aqueous alkaline suspension of low-grit, water-containing, zeolitic sodium aluminosilicate of the smallest particle size having the molar composition:

0.9 to 1.1 Na$_2$O:1 Al$_2$O$_3$: 1.8 to 2.3 SiO$_2$ with a water content depending on the degree of drying, which contains at least 99.8% by weight of a particle size of less than 25 µ and has a high cation exchange capability comprising:
 (a) reacting meta-kaolin with sodium hydroxide at elevated temperatures,
 (b) in a first aqueous akaline suspension having a composition corresponding to the molar ratios of:

1.5 to 5 Na$_2$O:1 Al$_2$O: 1.8 to 2.3 SiO$_2$: 40 to 200 H$_2$O, and
 (c) recovering said aqueous, alkaline suspension of zeolitic sodium aluminosilicate, the improvement consisting of:
 (d) slowly heating said first suspension from a charging temperature of 50° C. or below to a zeolitization temperature in the range of from 70° C. to 100° C., with a temperature rise averaging 20° C. within a period of from two to ten minutes,
 (e) feeding the first suspension continuously into a reactor heated to said zeolitization temperature and having progressively, separately zoned mixing areas with a stage-like effect and having at least seven stages while mixing said suspension suffficiently in the respective stages to avoid sedimentation,
 (f) passing said heated suspension through the reactor at a preselected temperature in the range of from 70° C. to 100° C. at such a rate and time until the degree of crystallization of the zeolitic sodium aluminosilicate, determined by X-ray, has reached at least 80% of the theorethically possible crystallinity, and
 (g) continuously removing an aqueous alkaline suspension of zeolitic sodium aluminosilicate from the end opposite of the intake end of the reactor, where said frist suspension is continuously fed into said reactor and said suspension of zeolitic sodium aluminosilicate is continuously removed at a throughput in the range of from 1 to 3 cubic meters of suspension per cubic meter of reactor volume per hour, and said first suspension is at a charging temperature of from 25° to 43° C. and said heating step (d) is by steam injection and occurs at least by the time said suspension leaves the first third of said reactor.

14. The process of claim 4 wherein said heating by steam injection occurs just before said suspension is fed into said reactor.

15. The process of claim 13 wherein said throughput is in the range of from 1 to 2 cubic meters of suspension per cubic meter of reactor volume and per hour.

16. The process of claim 13 wherein said heating by steam injection occurs after said suspension is introduced into said reactor.

17. The process of claim 13 wherein said heating by steam injection occurs just befope said suspension is fed into said reactor.

18. The process of claim 13 wherein said first aqueous alkaline suspension has a composition corresponding to the molar ratios of:

2 to 3 Na$_2$O:1 Al$_2$O$_3$:1.8 to 2.2 SiO$_2$: 40 to 80 H$_2$O and said zeolitization temperature is in the range of 75° C. to 95° C.

19. The process of claim 13 wherein said alkaline suspension of meta-kaolin is continuously fed into individual vessels of an agitator vessel cascade comprising at least seven vessels fluidly interconnected with the next adjacent vessels and each supplied with agitators, as said reactor having progressively separately zoned mixing areas.

20. The process of claim 13 wherein said alkaline suspension of meta-kaolin is continuously fed into an agitated vertical column divided by trays into at least seven separated, agitated chambers, fluidly interconnected with the next adjacent chambers, as said reactor having progressively, separately zoned mixing areas.

21. The process of claim 20 wherein the height of said separated, agitated chambers is from 0.35 to 0.7 times the inside longest cross-section dimension of said chamber.

22. The process of claim 21 wherein said separated, agitated chambers have a circular cross-section.

23. The process of claim 13 wherein said alkaline suspension of meta-kaolin is continuously fed into the entrance of an elongated substantially circular cross-sectional reaction zone having a ratio of length to diameter of from 3,000 to 7,000 as said reactor having progressively, separately zoned mixing areas.

24. The process of claim 23 wherein the ratio of length to diameter is about 5,000.

* * * * *